US012802354B2

(12) United States Patent
Lim et al.

(10) Patent No.: US 12,802,354 B2
(45) Date of Patent: Nov. 17, 2026

(54) METHOD AND SYSTEM FOR GENERATING VIRTUAL LiDAR DATA

(71) Applicant: MORAI INC., Seoul (KR)

(72) Inventors: Hojun Lim, Seoul (KR); Heecheol Yoo, Seoul (KR); Minki Lee, Seoul (KR)

(73) Assignee: MORAI INC., Seoul (KR)

( * ) Notice: Subject to any disclaimer, the term of this patent is extended or adjusted under 35 U.S.C. 154(b) by 156 days.

(21) Appl. No.: 18/928,447

(22) Filed: Oct. 28, 2024

(65) Prior Publication Data

US 2025/0336150 A1 Oct. 30, 2025

(30) Foreign Application Priority Data

Apr. 30, 2024 (KR) ........................ 10-2024-0057765

(51) Int. Cl.
*G06T 17/00* (2006.01)

(52) U.S. Cl.
CPC .......... *G06T 17/00* (2013.01); *G06T 2210/56* (2013.01)

(58) Field of Classification Search
CPC ....... G06T 2207/10028; G06T 2210/56; G06T 17/00; G06T 7/80; G06T 2207/20084; G06F 30/15; G06F 30/27
See application file for complete search history.

(56) References Cited

U.S. PATENT DOCUMENTS

| | | | | |
|---|---|---|---|---|
| 12,007,728 | B1 * | 6/2024 | Mohta | B60W 60/001 |
| 2022/0381909 | A1 | 12/2022 | Park et al. | |
| 2023/0418717 | A1 * | 12/2023 | Manivasagam | G01S 7/497 |

FOREIGN PATENT DOCUMENTS

| | | | |
|---|---|---|---|
| KR | 101572618 | B1 | 12/2015 |
| KR | 10-2021-0098187 | A | 8/2021 |

* cited by examiner

*Primary Examiner* — Hau H Nguyen

(74) *Attorney, Agent, or Firm* — Banner & Witcoff, Ltd.

(57) ABSTRACT

The present disclosure relates to a method for generating light detection and ranging (LiDAR) data, the method being performed by at least one processor and including: acquiring a first virtual LiDAR data of a first data type associated with a virtual LiDAR sensor, performing a dropout process on the first virtual LiDAR data of the first data type to acquire a second virtual LiDAR data of the first data type, and converting the second virtual LiDAR data of the first data type into second virtual LiDAR data of a second data type using a signal intensity model associated with an actual LiDAR sensor.

20 Claims, 11 Drawing Sheets

METHOD AND SYSTEM FOR GENERATING VIRTUAL LiDAR DATA

CROSS-REFERENCE TO RELATED APPLICATION

This application claims priority under 35 U.S.C § 119 to Korean Patent Application No. 10-2024-0057765, filed in the Korean Intellectual Property Office on Apr. 30, 2024, the entire contents of which are hereby incorporated by reference.

BACKGROUND

Field

The present disclosure relates to a method and a system for generating virtual LiDAR data, and specifically, to a method and a system for performing a dropout process on virtual LiDAR data associated with a virtual LiDAR sensor and generating virtual LiDAR data that simulates actual LiDAR data using a signal intensity model associated with an actual LiDAR sensor.

Description of Related Art

Interest in self-driving cars has recently increased and the Light Detection and Ranging (LiDAR) technology is in spotlight. LiDAR technology uses laser beams to scan the surroundings and measure the distance between specific objects. LiDAR is utilized in a variety of fields, including autonomous vehicles, robots, topographic modeling, architecture and urban planning, environmental monitoring, etc. Specifically, the environment can be scanned and the position and distance can be identified as a returned light that is the light emitted by a LiDAR emitting sensor and reflected by a target object is received by a LiDAR receiving sensor.

However, depending on the surrounding environment and certain conditions, LiDAR performance can be affected. For example, weather conditions, light intensity, surrounding environmental conditions, color of target objects, surface tilt information, surface material, object type information, distance, etc. may affect the performance of the LiDAR system. In particular, the signal intensity of a received light can decrease rapidly at a remote distance, resulting in point drops where some of the point clouds are not accumulated.

High-fidelity virtual sensors used to generate virtual LiDAR data similar to actual LiDAR data have a problem in that they cannot simulate various actual phenomena. In particular, when actual LiDAR data or target data to be simulated is given, there is a growing need for a virtual LiDAR data processing technique that minimizes a difference between virtual LiDAR data and the target data by processing the virtual LiDAR data so that realistic characteristics of the target data are reflected in the virtual LiDAR data.

SUMMARY

In order to solve one or more problems (e.g., the problems described above and/or other problems not explicitly described herein), the present disclosure provides a method and a system for generating virtual LiDAR data.

The present disclosure may be implemented in a variety of ways, including a method, a device (system) or a computer program stored in a readable storage medium.

In order to solve the technical problems above, a method for generating light detection and ranging (LiDAR) data in accordance with some aspects of the present disclosure is performed by at least one processor and includes acquiring a first virtual LiDAR data of a first data type associated with a virtual LiDAR sensor, performing a dropout process on the first virtual LiDAR data of the first data type to acquire a second virtual LiDAR data of the first data type, and converting the second virtual LiDAR data of the first data type into second virtual LiDAR data of a second data type using a signal intensity model associated with an actual LiDAR sensor.

According to some aspects, each point in the first virtual LiDAR data of the first data type may include position information, surface normal information, color information, and object type information.

According to some aspects, the acquiring the second virtual LiDAR data of the first data type may include calculating a dropout score for each point included in the first virtual LiDAR data of the first data type, and removing, based on the dropout score, some of the points in the first virtual LiDAR data of the first data type to acquire the second virtual LiDAR data of the first data type.

According to some aspects, the dropout score for each point included in the first virtual LiDAR data may be calculated based on path information of light emitted from the virtual LiDAR sensor, surface normal information, color information, and object type information.

According to some aspects, each point in the second virtual LiDAR data of the first data type may include position information and object type information.

According to some aspects, the signal intensity model associated with the actual LiDAR sensor may be a model prepared in advance by acquiring actual LiDAR data generated by the actual LiDAR sensor, categorizing the actual LiDAR data according to non-linear distance intervals and an environmental condition, and generating a probability density function (PDF) of a signal intensity distribution for each category, and the non-linear distance intervals is determined by non-linearly dividing a distance between the actual LiDAR sensor and an object.

According to some aspects, the non-linear distance intervals may increase in length as a distance from the actual LiDAR sensor increases.

According to some aspects, the converting the second virtual LiDAR data of the first data type into the second virtual LiDAR data of the second data type may include acquiring a specific point included in the second virtual LiDAR data of the first data type, acquiring distance information and object type information associated with the specific point, acquiring environmental information associated with the virtual LiDAR sensor, acquiring a probability density function for a specific category, which is associated with the distance information and the object type information associated with the specific point, and with the environmental information, and generating signal intensity information of the specific point based on the probability density function for the specific category.

According to some aspects, each point in the second virtual LiDAR data of the second data type may include position information and signal intensity information.

According to some aspects, the environmental information may include at least one of time information, weather information, temperature information, and season information.

In order to solve the technical problems above, a non-transitory computer-readable recording medium may store instructions that, when executed by one or more processors, cause performance of the method for generating light detection and ranging (LiDAR) data in accordance with some aspects of the present disclosure.

In order to solve the technical problems above, an information processing system, includes a communication module, a memory, and one or more processors connected to the memory and configured to execute one or more computer-readable programs included in the memory, wherein the one or more programs include instructions for acquiring a first virtual LiDAR data of a first data type associated with a virtual LiDAR sensor, performing a dropout process on the first virtual LiDAR data of the first data type to acquire a second virtual LiDAR data of the first data type, and converting the second virtual LiDAR data of the first data type into second virtual LiDAR data of a second data type using a signal intensity model associated with an actual LiDAR sensor, the number of points in the second virtual LiDAR data is less than the number of points in the first virtual LiDAR data, the first data type is different from the second data type, and the second data type simulates LiDAR data generated by the actual LiDAR sensor.

However, aspects and features of the present disclosure are not limited to those described above, and other aspects and features not mentioned will be clearly understood by a person skilled in the art from the detailed description, described below.

BRIEF DESCRIPTION OF THE DRAWINGS

Various examples of the present disclosure will be described with reference to the accompanying drawings explained below, where like reference numerals indicate like elements, but are not limited thereto.

DETAILED DESCRIPTION

Figure 1:
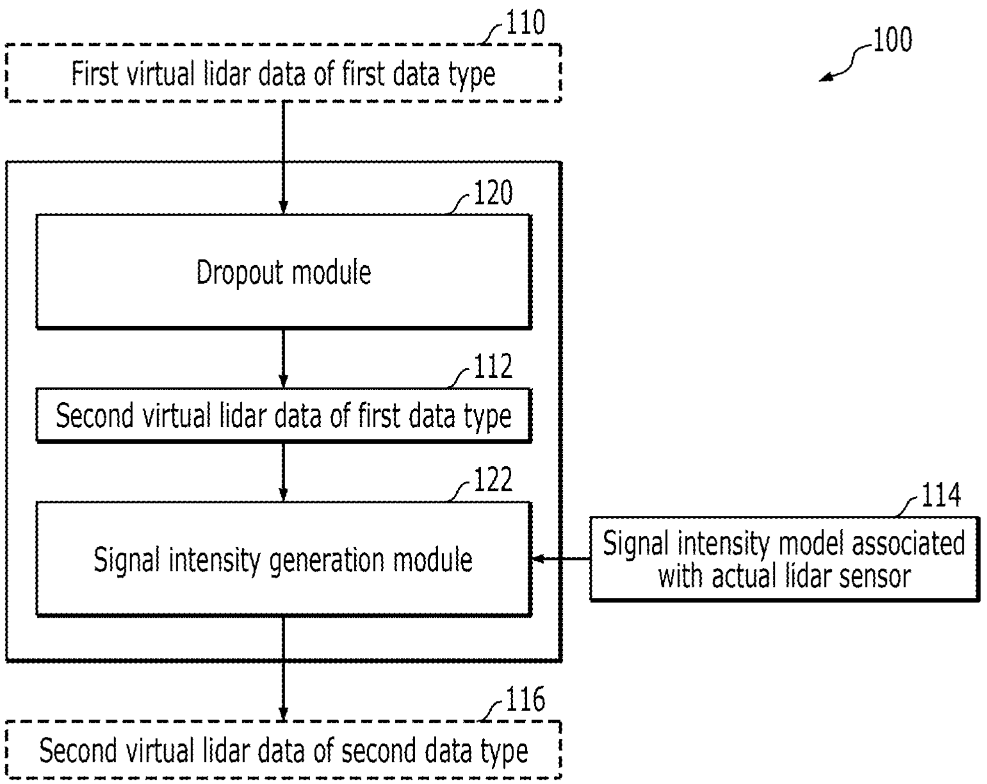
FIG. 1 illustrates an example of a method for generating virtual LiDAR data.

Hereinafter, example details for the practice of the present disclosure will be described in detail with reference to the accompanying drawings. However, in the following description, detailed description of well-known functions or configurations will be omitted when it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Throughout the description, when a portion is stated as "comprising (including)" an element, unless specified to the contrary, it intends to mean that the portion may additionally include another element, rather than excluding the same.

Throughout the description, the terms "about", etc. are meant to encompass tolerances when such are present.

Throughout the description, the expression "A and/or B" refers to "A, or B, or A and B".

Further, the term "module" or "unit" as used herein refers to a software or hardware component, and the "module" or the "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, or variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, a "display" may refer to any display device associated with a computing device, and for example, it may refer to any display device that is controlled by the computing device, or that can display any information/data provided from the computing device.

In the present disclosure, "each of a plurality of A's" may refer to each of all components included in the plurality of A's, or may refer to each of some of the components included in the plurality of A's.

FIG. 1 illustrates an example of a method for generating virtual LiDAR data 116. As illustrated in FIG. 1, a virtual LiDAR data generation system 100 may include a dropout module 120 and a signal intensity generation module 122.

The virtual LiDAR data generation system 100 may receive, as input information, first virtual LiDAR data 110 of a first data type associated with the virtual LiDAR sensor. In addition, the system 100 may receive and acquire a signal intensity model 114 associated with an actual LiDAR sensor to be simulated. The system 100 may generate, as output information, second virtual LiDAR data 116 of a second data type through a series of steps. The second virtual LiDAR data 116 of the second data type may simulate LiDAR data generated by the actual LiDAR sensor.

The first virtual LiDAR data 110 of the first data type may correspond to a set of a plurality of LiDAR point clouds generated by a simulator in a specific virtual environment. In addition, the simulator may include a virtual LiDAR sensor. In this case, the virtual LiDAR sensor may include a virtual LiDAR light emitting sensor that emits light and a virtual LiDAR light receiving sensor that receives light.

The virtual environment, which is a target to be measured by the virtual LiDAR sensor, may include a three-dimensional digitalization of various environments and objects based on an actual world environment to be measured or simulated. For example, the data acquired by measuring the virtual environment by the virtual LiDAR sensor may include: (i) information on various environments, such as weather information, time information, etc. acquired by measuring a virtual environment by the virtual LiDAR sensor; and (ii) information on various objects, such as type information of target objects (people, cars, buildings, animals, etc.), distance information between the virtual LiDAR sensor and the target object, position information of the target object, surface slope information of the target object when light emitted from the virtual LiDAR sensor is incident on the target object, surface color information of the target object, etc. The data acquired by measuring the virtual environment by the virtual LiDAR data sensor may be stored in a memory (not illustrated) of the system 100.

Each point of the first virtual LiDAR data 110 of the first data type associated with the virtual LiDAR sensor may include, among the data acquired by measuring the virtual environment by the virtual LiDAR sensor, at least some of position information (e.g., x, y, z), surface slope information (or surface normal information), color information (e.g., R, G, B), object type information (e.g., class information), weather information, or time information of the target object.

The dropout module 120 may receive the first virtual LiDAR data 110 of the first data type associated with the virtual LiDAR sensor and perform a dropout process to generate second virtual LiDAR data 112 of the first data type associated with the virtual LiDAR sensor. The number of points in the second virtual LiDAR data 112 may be less than the number of points in the first virtual LiDAR data 110.

The signal intensity generation module 122 may receive the second virtual LiDAR data 112 of the first data type from the dropout module 120. In addition, the signal intensity generation module 122 may receive and acquire a previously-prepared signal intensity model 114 associated with the actual LiDAR sensor. The signal intensity generation module 122 may use a signal intensity distribution probability density function included in the signal intensity model 114 associated with the actual LiDAR sensor to generate the second virtual LiDAR data 116 of the second data type that simulates the actual LiDAR data.

With such a configuration, it is possible to construct the virtual LiDAR data that is statistically similar to real LiDAR data in a short time without directly simulating complex physical phenomena.

Figure 2:
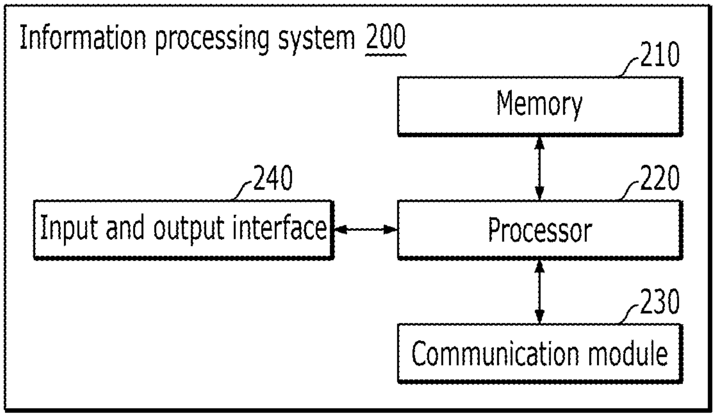
FIG. 2 is a block diagram illustrating an internal configuration of an information processing system.

FIG. 2 is a block diagram illustrating an internal configuration of an information processing system 200. The information processing system 200 may include a memory 210, a processor 220, a communication module 230, and an input and output interface 240. The information processing system 200 may be configured to communicate information and/or data through a network using the communication module 230.

The memory 210 may include any computer readable medium. The memory 210 may include a non-transitory computer readable recording medium, and may include a permanent mass storage device such as read only memory (ROM), disk drive, solid state drive (SSD), flash memory, etc. In another example, a non-destructive mass storage device such as ROM, SSD, flash memory, disk drive, etc.

may be included in the information processing system 200 as a separate permanent storage device that is distinct from the memory. In addition, the memory 210 may store an operating system and at least one program code (e.g., a code for executing a process on a device, etc.).

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for executing a process on a device, etc.) installed by files provided by developers or a file distribution system that distributes application installation files through the communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may provide device failure information to the user terminal.

The communication module 230 may provide a configuration or function for the user terminal (not illustrated) and the information processing system 200 to communicate with each other through a network, and may provide a configuration or function for the information processing system 200 to communicate with an external system (e.g., a separate cloud system). For example, control signals, commands, data, etc. provided under the control of the processor 220 of the information processing system 200 may be transmitted to the user terminal and/or the external system through the communication module 230 and the network through the communication module of the user terminal and/or an external system. For example, the processor 220 may transmit the device failure information to the user terminal through the communication module 230.

In addition, the input and output interface 240 of the information processing system 200 may be a means for interfacing with a device (not illustrated) for inputting or outputting, which may be connected to, or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

The processor 220 of the information processing system 200 may be configured to manage, process, and/or store the information and/or data received from a plurality of user terminals and/or a plurality of external systems. In response to a command to execute an application, the processor 220 may execute a main process of the application and a plurality of sub-processes for a plurality of devices associated with the application.

Figure 3:
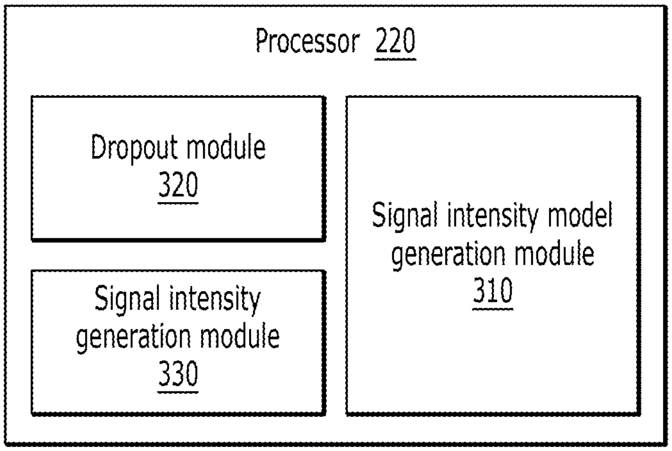
FIG. 3 is a block diagram illustrating an internal configuration of the processor 220 generating virtual LiDAR data.

FIG. 3 is a block diagram illustrating an internal configuration of the processor 220 generating virtual LiDAR data. The processor 220 generating the virtual LiDAR data may include a signal intensity model generation module 310, a dropout module 320, and a signal intensity generation module 330. In another aspect, the processor 220 may include only the dropout module 320 and the signal intensity generation module 330, and the signal intensity model generation module 310 may be provided separately.

The signal intensity generation module 310 may generate a signal intensity model including a signal intensity distribution probability density function (PDF) categorized according to various conditions based on the data obtained by measuring an actual environment by the actual LiDAR sensor.

The dropout module 320 may process the data obtained by measuring the virtual environment by the virtual LiDAR sensor by reflecting a point drop phenomenon. Accordingly, the dropout module 320 may receive, as input information, raw data obtained by measuring the virtual environment by the virtual LiDAR sensor and remove specific points of the points in the virtual LiDAR data according to a series of criteria to simulate a point drop phenomenon. The dropout module 320 may correspond to the dropout module 120 of FIG. 1.

The procedure of generating the signal intensity model by the signal intensity generation module 310 may be performed prior to the dropout process by the dropout module 320, such that the signal intensity model may be prepared in advance. In another aspect, the procedure of generating the signal intensity model by the signal intensity generation module 310 may be performed simultaneously with the dropout process by the dropout module 320 or after the dropout process by the dropout module 320. That is, the signal intensity model generation process by the signal intensity model generation module 310 and the virtual LiDAR data processing process by the dropout module 320 may be separate and independent procedures from each other.

The signal intensity generation module 330 may receive the signal intensity model associated with the actual LiDAR sensor generated by the signal intensity model generation module 310 and virtual LiDAR data associated with the virtual LiDAR sensor processed by the dropout module 320. The signal intensity generation module 330 may generate virtual LiDAR data that simulates actual LiDAR data based on the signal intensity model associated with the actual LiDAR sensor and the processed virtual LiDAR data.

Figure 4:
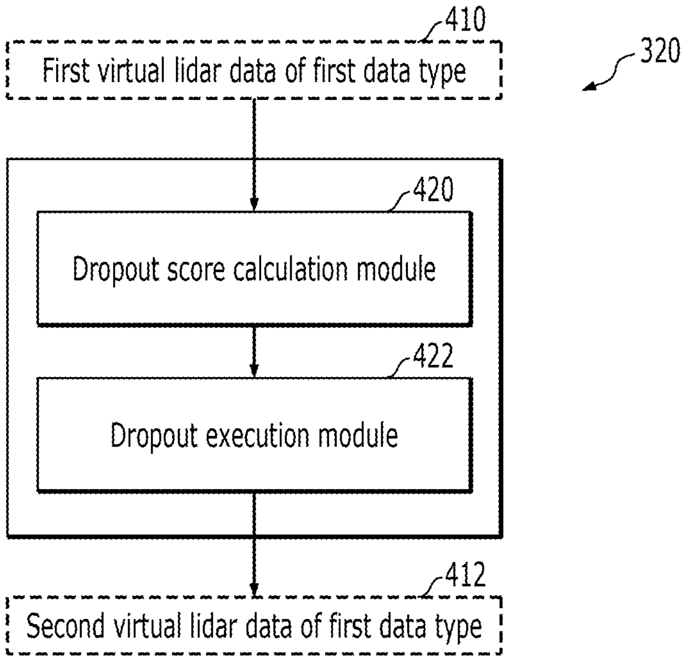
FIG. 4 is a diagram illustrating an example of a method for performing a dropout process.

FIG. 4 is a diagram illustrating an example of a method for performing a dropout process. As illustrated, the dropout module 320 may include a dropout score calculation module 420 and a dropout execution module 422.

The dropout module 320 may receive first virtual LiDAR data 410 of a first data type and perform the dropout process to generate second virtual LiDAR data 412 of the first data type. The first virtual LiDAR data of the first data type may correspond to the first virtual LiDAR data 110 of the first data type of FIG. 1. In addition, the second virtual LiDAR data 412 of the first data type may correspond to the second virtual LiDAR data 112 of the first data type of FIG. 1.

The dropout score calculation module 420 may calculate a dropout score for each point based on position information, surface normal information, color information, and object type information of each of the points of the first virtual LiDAR data 410 of the first data type.

The dropout execution module 422 may receive, from the dropout score calculation module 420, the position information, the object type information, and the dropout score information of each point in the first virtual LiDAR data 410 of the first data type. If the dropout score of the specific point corresponds to a predetermined criterion with respect to a total dropout score, the dropout execution module 422 may remove the corresponding specific point from the first virtual LiDAR data 410 of the first data type to acquire the second virtual LiDAR data 412 of the first data type. The predetermined criterion may include a certain lower percentage (%) or a certain lower number (count), etc. Through this dropout process, the number of points included in the second virtual LiDAR data 412 of the first data type may be less than the number of points included in the first virtual LiDAR data 410 of the first data type.

With this configuration, the actual point drop phenomenon of the actual LiDAR sensor that occurs according to distance information, medium characteristics, object type information, environmental information, etc. of the object to be measured may be reflected in the virtual LiDAR data to enhance reality.

Figure 5:
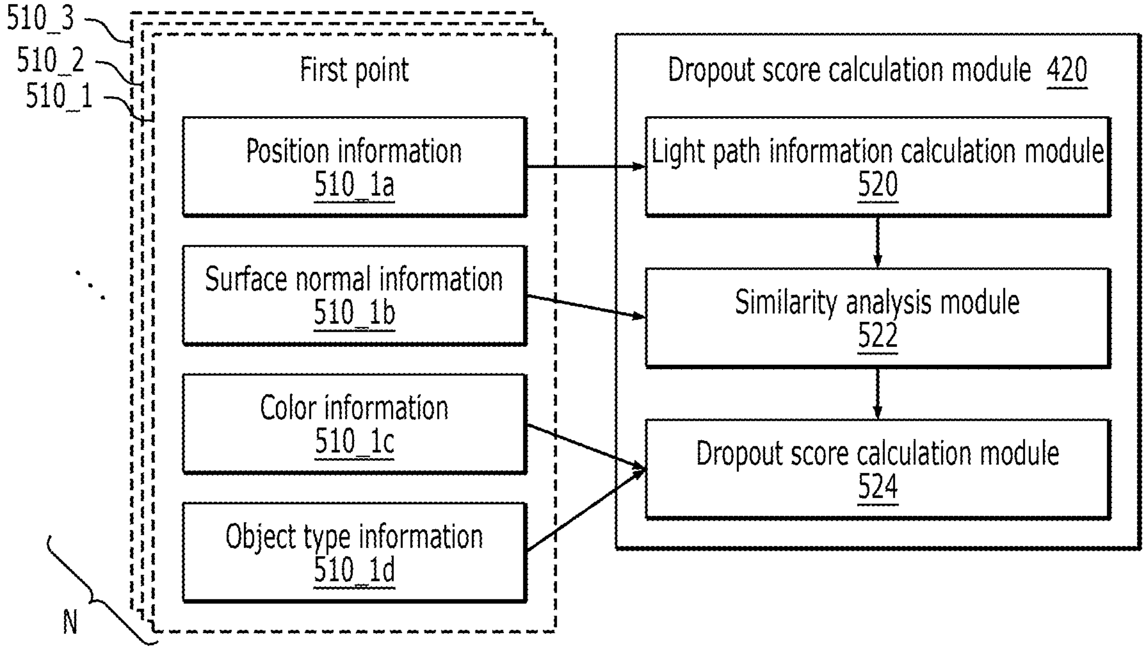
FIG. 5 is a diagram illustrating an example of a method for calculating a dropout score.

FIG. 5 is a diagram illustrating an example of a method for calculating a dropout score. The dropout score calculation module 420 may receive information on N points included in one of the point cloud sets of the first virtual LiDAR data of the first data type to calculate a dropout score of each point. N pieces of point information from a first point 510_1 to an N-th point 510_N may correspond to the first virtual LiDAR data 410 of the first data type of FIG. 4.

The first point 510_1 may include position information 510_1*a*, surface normal information 510_1*b*, color information 510_1*c*, and object type information 510_1*d*. Likewise, all of the other points 510_2 to 510_N may also include position information, surface normal information, color information, and object type information.

A process in the dropout score calculation module 420 for calculating a dropout score of the first point 510_1 based on the position information 510_1*a*, the surface normal information 510_1*b*, the color information 510_1*c*, and the object type information 510_1*d* of the first point 510_1 of the points in the first virtual LiDAR data of the first data type will be described below. The dropout score of each of the other points 510_2 to 510_N may also be calculated in the same or similar manner.

A light path information calculation module 520 may calculate path information of the light emitted from the virtual LiDAR sensor toward the first point 510_1 based on the position information 510_1*a* of the first point 510_1 and the position information of the virtual LiDAR sensor. For example, if the position information 510_1*a* of the first point 510_1 corresponds to (x, y, z) on a 3D orthogonal coordinate system, the corresponding orthogonal coordinate system may be converted into a spherical coordinate system based on the position information of the virtual LiDAR sensor to generate information such as radius (r), azimuth ($\phi$), and elevation ($\theta$). Accordingly, the light path information calculation module 520 may calculate light path information ((r, $\phi$, $\theta$)) of the first point.

A similarity analysis module 522 may receive the surface normal information 510_1*b* of the first point. In addition, the similarity analysis module 522 may receive the light path information ((r, $\phi$, $\theta$)) of the first point 510_1 from the light path information calculation module 520. The surface normal information 510_1*b* of the first point may include a surface normal vector (($n_x$, $n_y$, $n_z$)). The similarity analysis module 522 may calculate a cosine similarity based on the surface normal vector (($n_x$, $n_y$, $n_z$)) of the first point and the light path information ((r, $\phi$, $\theta$)) to calculate a cosine similarity score ((S)) of the first point 510_1.

A dropout score calculation module 524 may receive the color information 510_1*c* and the object type information 510_1*d* of the first point. In addition, the dropout score calculation module 524 may also receive the similarity score ((S)) of the first point 510_1 from the similarity analysis module 522. The dropout score calculation module 524 may calculate a dropout score ((D)) of the first point 510_1 based on the received information associated with the first point.

The dropout score calculation module 524 may calculate a dropout score using the following equation.

$$D = G_i + (1 - G_i) * S^{1.5} * \frac{R + G + B}{3} * G_m$$

where, $G_i$ may correspond to an initial value of the dropout score of the first point 510_1. For example, $G_i$ may be a predetermined constant. In addition, S may correspond to the similarity score (S) of the first point. In addition, R, G, B may correspond to a value acquired by normalizing the color information of the first point to have a value between 0 and 1, and may be acquired or generated from the color information 510_1*c* of the first point. In addition, ($G_m$) may be surface medium information and may be acquired or generated from the object type information 510_1*d* of the first point. Accordingly, the dropout score ((D)) calculated by the dropout score calculation module 524 may have a value between $G_i$~1.

The virtual LiDAR data of the first data type, including the dropout score ((D)) of each point generated by the dropout score calculation module 420, may be transmitted to the dropout execution module 422. The dropout execution module 422 may perform the dropout process based on the received dropout score of each point.

With this configuration, the system according to some aspects may calculate the dropout score by comprehensively considering the path information, the surface normal information, the color information, and the object type information of the light at each point in the virtual LiDAR data, such that a method for generating virtual LiDAR data that reflects the signal intensity variation of the light received by the virtual LiDAR light receiving sensor may be provided.

Figure 6:
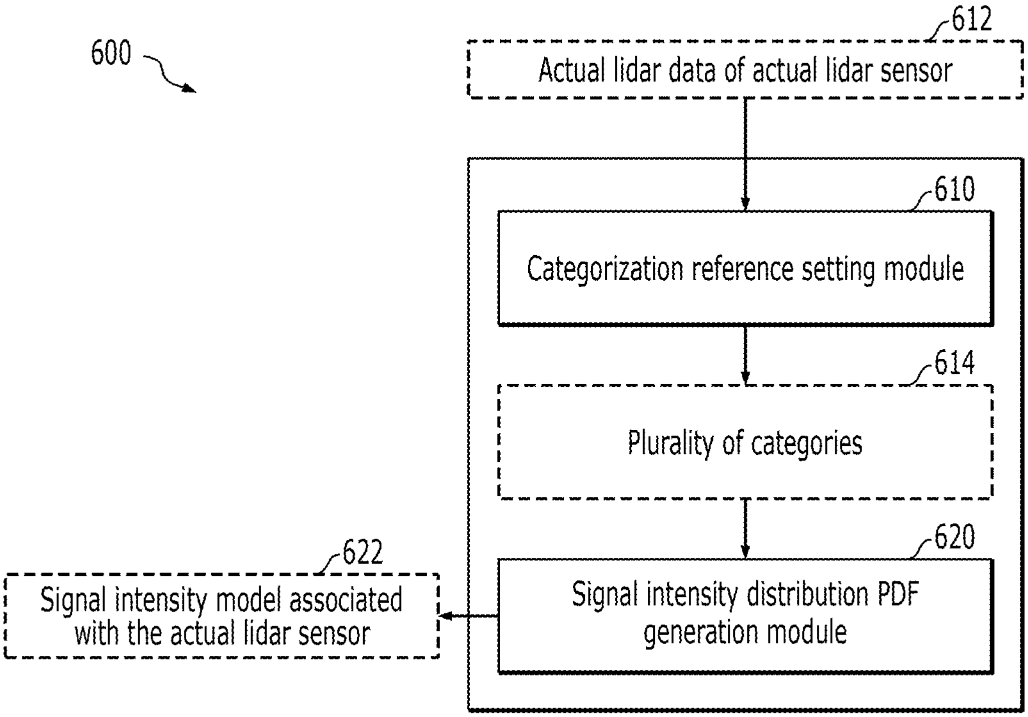
FIG. 6 is a diagram illustrating an example of a method for generating a signal intensity model associated with the actual LiDAR sensor

FIG. 6 is a diagram illustrating an example of a method for generating a signal intensity model associated with the actual LiDAR sensor. A signal intensity generation module 600 may include a categorization reference setting module 610 and a signal intensity distribution PDF generation module 620. The signal intensity generation module 600 may receive, as input information, actual LiDAR data 612 generated by the actual LiDAR sensor, and generate, as output information, a signal intensity model 622 associated with the actual LiDAR sensor through a series of signal intensity generation processes. The signal intensity generation module 600 may correspond to the signal intensity model generation module 310 of FIG. 3.

The categorization reference setting module 610 may acquire the actual LiDAR data 612 generated by the actual LiDAR sensor. The actual LiDAR data 612 may include data such as nuScenes, nuScenes-lidarseg, nuImages, Waymo, etc., but is not limited thereto.

The categorization reference setting module 610 may set a categorization criterion for categorizing the actual LiDAR data 612. The categorization criterion may include an environmental condition measured by the actual LiDAR sensor such as weather conditions, time conditions, etc. In addition, the categorization criterion may include distance conditions, class conditions, etc. based on the position information and the object type information included in the actual LiDAR data 612. The class conditions may include information on a type or medium of an object upon which the light emitted from the actual LiDAR sensor is incident.

The categorization reference setting module 610 may non-linearly segment distance intervals based on the position information of each point included in the actual LiDAR data. Accordingly, the categorization reference setting module 610 may set the distance intervals of points more finely at a closer distance to the actual LiDAR sensor, and set the distance intervals more roughly at a farther distance from the actual LiDAR sensor so as to reflect the characteristics of the actual LiDAR point cloud. That is, it is possible to reflect a physical actual phenomenon in which the number of points acquired increases as the target to be measured is at a closer distance to the actual lidar, and the number of points acquired decreases at a farther distance.

The signal intensity distribution PDF generation module 620 may classify the actual LiDAR data 612 based on a plurality of categories 614 generated in the categorization reference setting module 610. A probability density function (PDF) of the signal intensity distribution may be acquired for each of the plurality of categories 614 by normalization. For example, the signal intensity distribution PDF for a specific time, a specific weather, a specific object type, and non-linearly segmented distance intervals may be generated.

The signal intensity model 622 associated with the actual LiDAR sensor may be prepared in advance prior to the generation of the virtual LiDAR data. That is, before the virtual LiDAR data generation system 100 receives and processes the first virtual LiDAR data of the first data type associated with the virtual LiDAR sensor and generates the second virtual LiDAR data of the second data type, a series of signal intensity generation processes may be performed by the signal intensity generation module 600 in advance.

Figure 7:
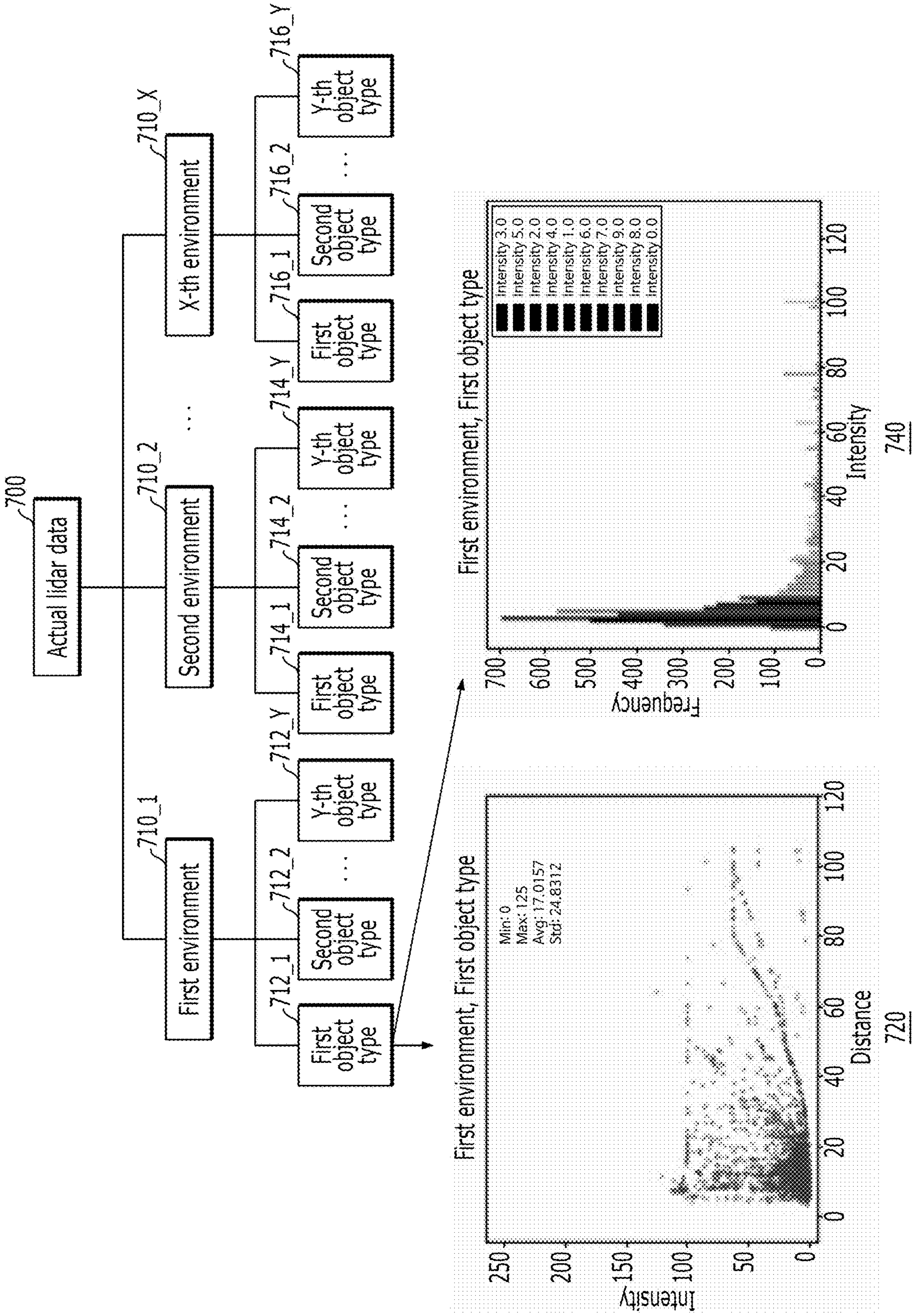
FIG. 7 is a diagram illustrating an example of a method for categorizing actual LiDAR data.

FIG. 7 is a diagram illustrating an example of a method for categorizing actual LiDAR data 700. The processor (e.g., at least one processor of the virtual LiDAR data generation system) may generate actual LiDAR data set based on the actual LiDAR data 700.

The actual LiDAR data 700 may include information on the signal intensity of the laser measured through the actual LiDAR device. Specifically, the actual LiDAR data 700 may include the signal intensity information including labeling of the environmental information, the object type information, and the object distance information on which the LiDAR is measured. Accordingly, the actual LiDAR data 700 may be categorized according to the environmental conditions, the object type conditions, and/or the object distance conditions.

The actual LiDAR data 700 may be categorized into a first environment 710_1 to an X-th environment 710_X (where, X is a natural number of 2 or more) according to the environmental conditions. The environmental conditions may include at least one of a weather condition, a time condition, a temperature condition, and a seasonal condition. For example, the weather condition may be categorized as “No Rain”, “Rain”, “Fog”, etc., but is not limited thereto. The time condition may be categorized into “Morning”, “Afternoon”, “Evening”, “Noon”, etc., but is not limited thereto.

The actual LiDAR data 700 may be categorized such that different environmental conditions are applied overlappingly. For example, the weather and time conditions may be applied overlappingly to categorize the data according to categories such as “No Rain-Morning”, “No Rain-Afternoon”, “Rain-Morning”, “Rain-Afternoon”, etc. In addition, the weather conditions, the time conditions, and the seasonal conditions may be applied overlappingly to categorize the data according to categories such as “No Rain-Morning-Spring”, “No Rain-Afternoon-Summer”, “Rain-Morning-Fall”, “Rain-After-Winter’, etc. This is only an example, and the conditions applied to categorization are not limited thereto.

The actual LiDAR data 700 categorized according to the environmental conditions may be re-categorized according to the object type. Specifically, the data categorized into the first environment 710_1 to the X-th environment 710_X according to the environmental conditions may be re-categorized according to the object types within each category. For example, the actual LiDAR data 700 categorized into the first environment 710_1 may be re-categorized into a first object type 712_1 to a Y-th object type 712_Y (where, Y is a natural number of 2 or more). Likewise, the actual LiDAR data 700 categorized into the X-th environment 710_X may be re-categorized into a first object type 716_1 to a Y-th object type 716_Y.

The actual LiDAR data 700 may be organized within each category and stored in a virtual LiDAR data generation system. Specifically, the actual LiDAR data 700 may be expressed as signal intensity information for a distance within each category according to the environmental conditions and the object type conditions. A first graph 720 is an example of a graphical visualization of a distribution of signal intensity information for a distance with respect to the actual LiDAR data 700 included in the category of the first environment 710_1 and the first object type 712_1.

Additionally or alternatively, the actual LiDAR data 700 may be expressed as a frequency for the signal intensity information within each category according to the environmental conditions and the object type conditions. A second graph 740 is an example of a graphical visualization of a frequency distribution for the signal intensity information with respect to the actual LiDAR data 700 included in the category of the first environment 710_1 and the first object type 712_1.

The processor may calculate descriptive statistics for each category, based on the actual LiDAR data 700 organized within each category. The descriptive statistics may include an average value, a standard deviation, a maximum value, and a minimum value of the signal intensity. In this case, the descriptive statistics for each category may be calculated based on the signal intensity information for the distance, which is organized within each category.

In addition, the descriptive statistics may include a frequency distribution of the signal intensity according to specific distance intervals. In this case, the descriptive statistics for each category may be calculated based on the frequency of the signal intensity information, which is organized within each category. An example of calculating the descriptive statistics for each category according to the non-linearly segmented distance intervals will be described in detail below with reference to FIG. 8.

FIG. 7 illustrates that the actual LiDAR data 700 is categorized according to the environmental conditions, and the categorized data is re-categorized according to the object type conditions, but the steps and order of categorization are not limited thereto. For example, the actual LiDAR data 700 may be categorized according to the object type conditions and then re-categorized according to the environmental conditions. In addition, the data may be re-categorized according to additional conditions other than the environmental conditions and the object type conditions (e.g., object distance intervals, etc.).

Figure 8:
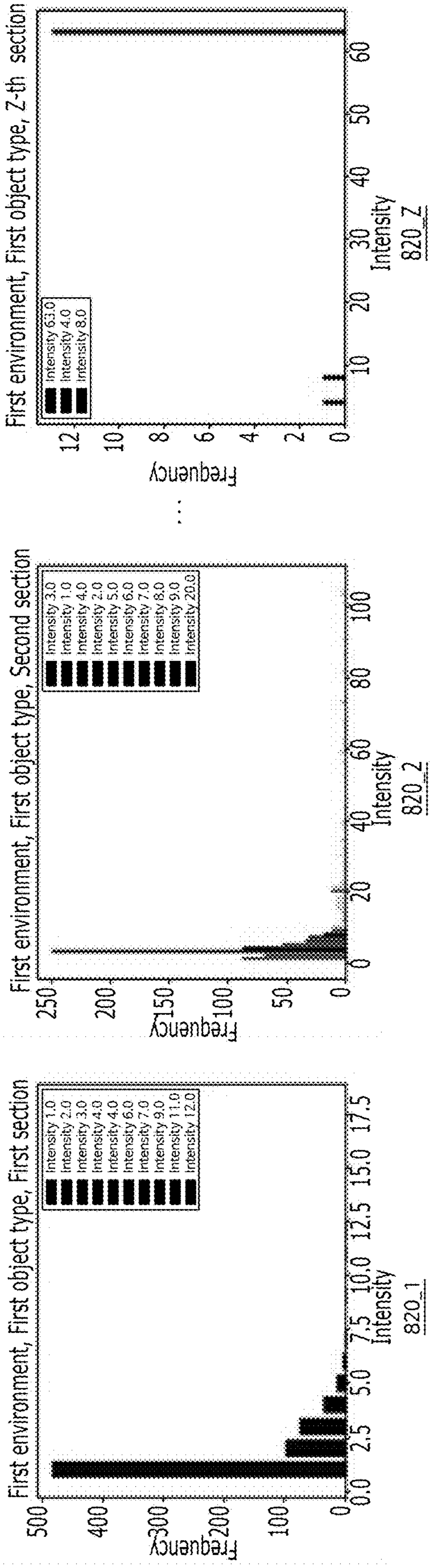
FIG. 8 is a diagram illustrating an example of processing the categorized actual LiDAR data.

FIG. 8 is a diagram illustrating an example of processing the categorized actual LiDAR data. The processor may calculate the descriptive statistics for each category using the categorized actual LiDAR data 700. Specifically, the processor may classify the frequency distribution of the signal intensity information into specific distance intervals within each category according to the environmental conditions and the object type conditions. For example, the actual LiDAR data included in first environment and first object type categories may be classified into a first interval to a Z-th interval (where, Z is a natural number) according to a distance.

The distance intervals may be non-linearly segmented distance intervals. Specifically, if the first to Z-th intervals are segmented, the distance intervals may be more densely segmented at a closer distance to the actual LiDAR sensor, and the distance intervals may be more roughly segmented at a farther distance from the actual LiDAR sensor. In other words, the points acquired at a closer distance to the actual LiDAR sensor may be statistically analyzed by dividing the intervals more finely, and points acquired at a remote distance may be statistically analyzed by dividing the interval relatively more roughly.

For example, the first interval and the second to Z-th intervals may correspond to a 0-2 m interval and 2-5 m to 96-107 m intervals, etc. in which the length of the distance intervals increases further as the distance from the actual LiDAR sensor increases. As another example, for a distance of 0 up to 107 m away from the actual LiDAR sensor, distance intervals from the first to 15th intervals may be classified as 0-2 m, 2-4 m, 4-7 m, 7-11 m, 11-17 m, 17-23 m, 23-30 m, 30-37 m, 37-45 m, 45-54 m, 54-64 m, 64-74 m, 74-85 m, 85-96 m, and 96-107 m, respectively.

Graphs 820_1, 820_2, and 820_Z are examples of the graphical visualization of frequency distributions of the signal intensity information measured in the first, second, and Z-th intervals with respect to the actual LiDAR data included in the first environment and first object type categories, respectively.

The graph 820_1 is an example of a graphical visualization of the frequency distribution of the signal intensity information measured in the first interval with respect to the actual LiDAR data included in the first environment and first object type categories. The processor may calculate the frequency distribution of the signal intensity information in the first interval based on the signal intensity information included in the first interval. The processor may generate a signal intensity distribution PDF as a signal intensity model in the first interval through normalization. The generated signal intensity distribution PDF may be a signal intensity distribution PDF associated with the first environment, the first object type, and the first interval.

The graph 820_2 and the graph 820_Z are the graphical visualization of the frequency distribution of the signal intensity information measured in the second interval and the frequency distribution of the signal intensity information measured in the Z-th interval, with respect to the actual LiDAR data included in the first environment and first object type categories. Likewise, for the second to Z-th intervals, the frequency distribution of the signal intensity information in each interval may be calculated based on the signal intensity information included in each interval. A signal intensity distribution PDF may be generated based on the calculated frequency distribution.

With this configuration, in the virtual LiDAR data processing, it is possible to reflect the fact that the importance of points close to the actual LiDAR sensor is higher than the points measured at far distances. Since the number of total distance intervals is the same in both the case of linearly dividing the distance intervals and the case of non-linearly dividing as above, there is not much difference in terms of computational burden. In addition, even if the points measured at a remote distance are not accurately perceived, they will not actually have a critical impact on autonomous driving. Accordingly, by focusing on analyzing the points that actually affect the autonomous driving, it is possible to simulate the signal intensity model of the points measured by the actual LiDAR sensor more precisely.

Figure 9:
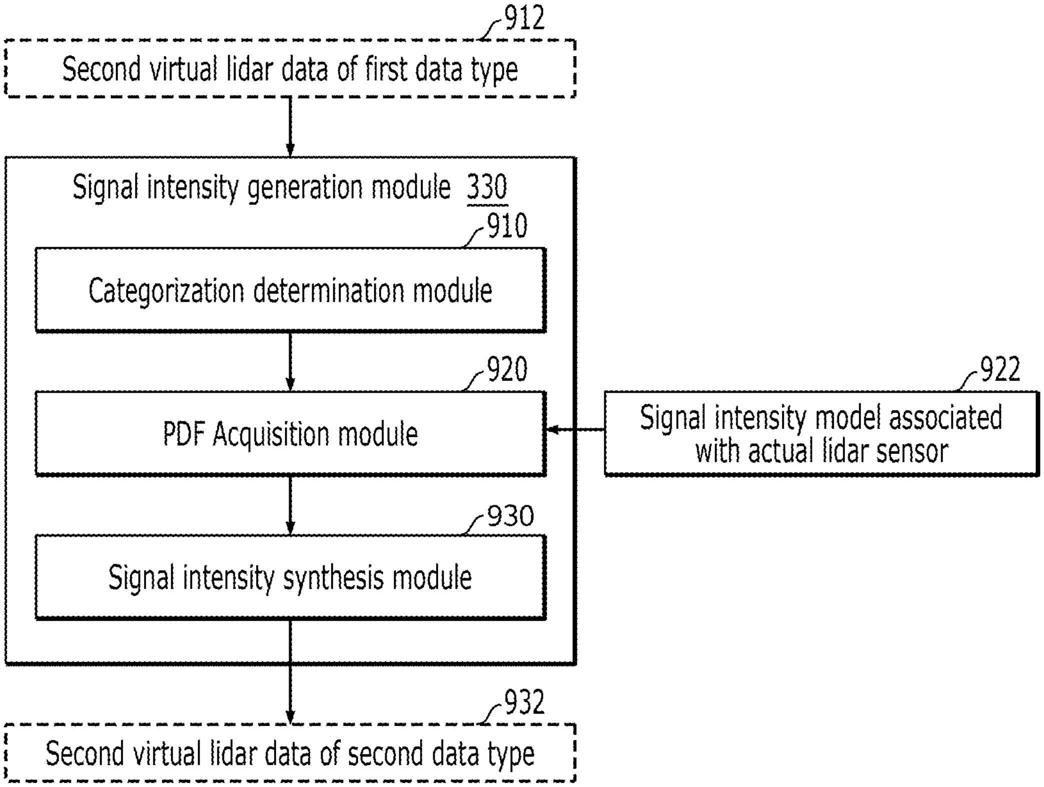
FIG. 9 is a diagram illustrating an example of a method for generating virtual LiDAR data that simulates the actual LiDAR data.

FIG. 9 is a diagram illustrating an example of a method for generating virtual LiDAR data that simulates the actual LiDAR data. The signal intensity generation module 330 may output second virtual LiDAR data 932 of the second data type based on second virtual LiDAR data 912 of the first data type and a signal intensity model 922 associated with the actual LiDAR sensor. The second virtual LiDAR data 912 of the first data type, the signal intensity model 922 associated with the actual LiDAR sensor, the second virtual LiDAR data 932 of the second data type, and the signal intensity generation module 330 may correspond to the first virtual LiDAR data 110 of the first data type, the signal intensity model 114 associated with the actual LiDAR sensor, the second virtual LiDAR data 116 of the second data type, and the signal intensity generation module 122 of FIG. 1. In addition, the second virtual LiDAR data 932 of the second data type may be virtual LiDAR data that simulates the actual LiDAR data.

A category determination module 910 may receive, from the virtual LiDAR simulator, time information and weather information associated with each point in the second virtual LiDAR data 912 of the first data type. In addition, the category determination module 910 may receive position information and object type information of each point included in the second virtual LiDAR data 912 of the first data type. The category determination module 910 may calculate distance information (e.g., distance information from the virtual LiDAR sensor to each point) based on the position information of each point. Accordingly, the category determination module 910 may generate, as a set of measurement conditions, a set of time information, weather information, object type information, and distance information of each point. The time information and/or the weather information may be omitted.

A PDF acquisition module 920 may receive, from the category determination module 910, the set of measurement conditions of each point in the second virtual LiDAR data 912 of the first data type. In addition, the PDF acquisition module 920 may receive the signal intensity model 922 associated with the actual LiDAR sensor. Accordingly, the PDF acquisition module 920 may acquire a signal intensity PDF corresponding to the set of measurement conditions of each point of the virtual LiDAR data from the signal intensity model 922 associated with the actual LiDAR sensor, that is, from among the signal intensity PDFs for the actual LiDAR data.

A signal intensity synthesis module 930 may receive a signal intensity PDF associated with each point from the PDF acquisition module 920. The signal intensity synthesis module 930 may synthesize and estimate the signal intensity for the set of measurement conditions of each point in the virtual LiDAR data using a corresponding signal intensity PDF and inverse CDF sampling. That is, the signal intensity synthesis module 930 may randomly generate and synthesize signal intensity information according to the probability distribution of the signal intensity PDF associated with the actual LiDAR and allocate the result to each point in the corresponding virtual LiDAR data. Through this series of processes, the signal intensity information and the position information allocated to each point may be included in the second virtual LiDAR data of the second data type.

With this configuration, the virtual LiDAR data similar to the actual LiDAR data may be statistically constructed.

Figure 10:
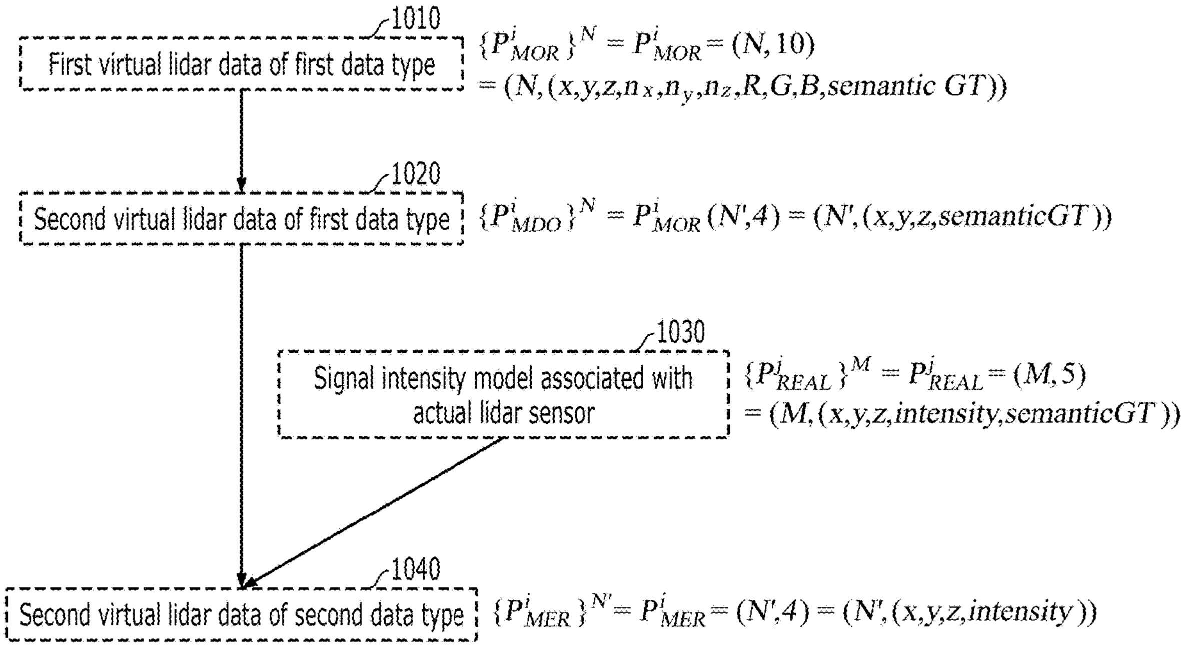
FIG. 10 is a flowchart illustrating how the information included in each point in the virtual LiDAR data is changed by the method for generating virtual LiDAR data.

FIG. 10 is a flowchart illustrating how the information included in each point in the virtual LiDAR data is changed by the method for generating virtual LiDAR data. The processor may receive first virtual LiDAR data 1010 of a first data type associated with the virtual LiDAR sensor.

The first virtual LiDAR data of the first data type associated with the virtual LiDAR sensor may include information that can be acquired by measuring the virtual environment by the virtual LiDAR sensor. For example, information that can be acquired by the virtual LiDAR sensor by measuring a virtual environment may include time information at the time of measurement, weather information, position information of each point, surface slope (normal) information, color information, object type information, etc.

The first virtual LiDAR data 1010 of the first data type received by the process may include (i) information ($P^i$) on the number of point clouds as a set of point clouds, (ii) information (N) on the number of points included in each point cloud, (iii) position information (x, y, z) of each point, information ($n_x$, $n_y$, $n_z$) on surface slope (normal), color information (R, G, B), object type information (semanticGT), etc.

The processor may generate second virtual LiDAR data 1020 of the first data type reflecting the point drop phenomenon through the dropout process based on the received first virtual LiDAR data 1010 of the first data type. For the second virtual LiDAR data 1020 of the first data type, the following information may be selected and included: (i) information ($P^i$) on the number of point clouds as a set of point clouds, (ii) information (N') on the number of points included in each point cloud, and (iii) object type information (semanticGT) of each point.

Since the first virtual LiDAR data 1010 of the first data type and the second virtual LiDAR data 1020 of the first data type are based on the information obtained by measuring the same virtual environment with the same virtual LiDAR, the information ($P^i$) on the number of point clouds as the set of point clouds may be the same. Meanwhile, the second virtual LiDAR data 1020 of the first data type may be generated through the process of reflecting the point drop phenomenon based on the first virtual LiDAR data 1010 of the first data type and removing a certain percentage or number of points for each set of point clouds. Accordingly, the number (N) of points included in each point cloud of the first virtual LiDAR data 1010 of the first data type may be greater than the number (N') of points included in each point cloud of the second virtual LiDAR data 1020 of the first data type. That is, a relationship of N>N' may be established. In summary, through the dropout process, the processor may extract only the position information and the object type information of each of a certain number of filtered points as the second virtual LiDAR data of the first data type.

The processor may generate second virtual LiDAR data 1040 of the second data type based on the second virtual LiDAR data 1020 of the first data type associated with the virtual LiDAR sensor and a signal intensity model 1030 associated with the actual LiDAR sensor. The first data type and the second data type may refer to, among the virtual LiDAR data, a type that includes the object type information (semanticGT) and a type that includes the signal intensity, respectively.

The signal intensity model 1030 associated with the actual LiDAR sensor may include a signal intensity distribution probability density function (PDF) according to each condition, categorized according to various conditions based on the data obtained by the actual LiDAR sensor by measuring the actual environment. The various conditions herein may refer to the environmental information obtained by the actual LiDAR sensor by measuring the virtual environment, and may include time information, weather information, distance information of objects to be measured from the actual LiDAR sensor, object type information of target objects, etc. That is, the signal intensity model 1030 associated with the actual LiDAR sensor may include (i) information ($P^j$) on the number of point clouds as a set of point clouds based on the actual LiDAR data, (ii) information (M) on the number of points included in each point cloud, (iii) position information (x, y, z) of each point, signal intensity information (intensity), object type information (semanticGT), etc. In this case, the number ($P^j$) of point clouds of the actual LIDAR data may be the same as or different from the number ($P^i$) of point clouds of the virtual LIDAR data. In addition, each of the point clouds may include the same or different number (M, N') of points. In addition, the object type information (semanticGT) included in the virtual LiDAR data and the object type information (semanticGT) included in the actual LiDAR data may be the same as or different from each other.

The processor may acquire the environmental information (weather information, time information, etc.) acquired from a virtual LiDAR simulator, the position information of each point included in the second virtual LiDAR data 1020 of the first data type, and the signal intensity distribution probability density functions included in the signal intensity model 1030 associated with the actual LiDAR sensor corresponding to the object type information $$[P^i_{MOR}(N', (x, y, z, semanticGT))].$$

The signal distribution probability density function may be generated based on $$[P^j_{REAL}(M, (x, y, z, \text{intensity}, semanticGT))].$$

The processor may generate the second virtual LiDAR data 1040 of the second data type based on the second virtual LiDAR data 1020 of the first data type and the signal intensity distribution probability density functions included in the signal intensity model 1030. The second virtual LiDAR data 1040 of the second data type may include (i) the number ($P^i$) of point clouds as a set of point clouds based on the virtual LiDAR sensor, (ii) the number (N') of points included in each point cloud, and (iii) position information (x, y, z) and signal intensity information (intensity) of each point. The signal intensity information (intensity) included in the second virtual LiDAR data of the second data type may be randomly sampled and generated according to the probability distribution of the signal intensity distribution probability density function corresponding to each point in the virtual LiDAR data.

With this configuration, because only the information necessary for the computations may be selectively taken at each step such as the dropout process, the signal intensity synthesis process, etc., the reality of the virtual LiDAR data may be enhanced with less time and cost.

Figure 11:
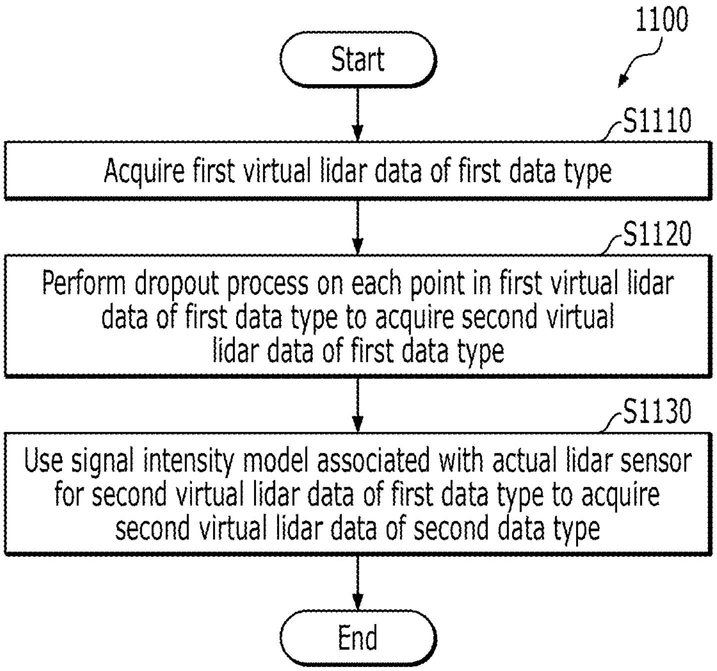
FIG. 11 is a flowchart illustrating a method 1100 for generating the virtual LiDAR data.

FIG. 11 is a flowchart illustrating a method 1100 for generating the virtual LiDAR data. The method 1100 for generating the virtual LiDAR data 1100 may be performed by at least one processor of an information processing system. For example, the method 1100 for generating the virtual LiDAR data may be initiated by acquiring the first virtual LiDAR data of the first data type associated with the virtual LiDAR, at S1110.

The first virtual LiDAR data of the first data type may include the position information, the surface normal information (surface slope information), the color information, and the object type information at each point. In addition, the first virtual LiDAR data of the first data type may include at least some of information on a specific virtual environment measured by the virtual LiDAR sensor, such as measurement weather information, measurement time information, etc. The first data type may refer to a set of raw data obtained by the virtual LiDAR sensor by measuring an ideal virtual environment.

The processor may perform the dropout process on each point in the first virtual LiDAR data of the first data type to acquire the second virtual LiDAR data of the first data type, at S1120. As the dropout process removes a specific number of points from the points in the first virtual LiDAR data of the first data type, the number of points in the second virtual LiDAR data of the first data type may be less than the number of points in the second virtual LiDAR data of the first data type. In addition, each point in the second virtual LiDAR data of the first data type may include the position information and the object type information.

The processor may calculate a dropout score for each point included in the first virtual LiDAR data of the first data type, and remove some of the points in the first virtual LiDAR data of the first data type based on the dropout score to acquire the second virtual LiDAR data of the first data type.

The dropout score for each point included in the first virtual LiDAR data may be calculated based on the path information, the surface normal information, the color information, and the object type information of the light emitted from the virtual LiDAR sensor.

The processor may use a signal intensity model associated with the actual LiDAR sensor for the second virtual LiDAR data of the first data type to acquire the second virtual LiDAR data of the second data type, at S1130. The first data type may be different from the second data type. In addition, the second data type may simulate LiDAR data generated by the actual LiDAR sensor. Additionally, each point in the second virtual LiDAR data of the second data type may include the position information and the signal intensity information.

The signal intensity model associated with the actual LiDAR sensor may be a model prepared in advance by acquiring the actual LiDAR data generated by the actual LiDAR sensor, categorizing the actual LiDAR data according to the non-linear distance intervals and the environmental conditions, and generating the probability density function of the signal intensity distribution for each category. The non-linear distance intervals may be obtained by non-linearly segmenting a distance between the actual LiDAR sensor and the object. For example, the non-linear distance intervals may increase in length as the distance from the actual LiDAR sensor increases.

The processor may be configured to acquire a specific point included in the second virtual LiDAR data of the first data type, acquire the distance information and the object type information associated with the specific point, acquire the environmental information associated with the virtual LiDAR sensor, acquire the probability density function for a specific category, which is associated with the distance information and the object type information associated with the specific point, and with the environmental information, and generate the signal intensity information of the specific point based on the probability density function for the specific category, so as to convert the second virtual LiDAR data of the first data type into the second virtual LiDAR data of the second data type, The environmental information may include at least one of the time information, the weather information, the temperature information, and the season information.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with commands stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An example storage medium may be connected to the processor such that the processor may read or write information from or to the storage medium. Alternatively, the storage medium may be integrated into the processor. The processor and the storage medium may be present in the ASIC. The ASIC may be present in the user terminal. Alternatively, the processor and storage medium may exist as separate components in the user terminal.

Although the features described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described herein in connection with some examples, various modifications and changes can be made without departing from the scope of the present disclosure, which can be understood by those skilled in the art to which the present disclosure pertains. In addition, such modifications and changes should be considered within the scope of the claims appended herein.

Certain examples of the present disclosure have been described above for purposes of illustration only, and those skilled in the art with ordinary knowledge of the present disclosure will be able to make various modifications, changes and additions within the spirit and scope of the present disclosure, and such modifications, changes and additions should be construed to be included in a scope of the claims.

It should be understood that those of ordinary skill in the art to which the present disclosure pertains can make various substitutions, modifications and changes without departing from the technical spirit of the present disclosure, and thus, the present disclosure is not limited by the aspects described above and the accompanying drawings.

The invention claimed is:

1. A method for generating light detection and ranging (LiDAR) data, the method being performed by at least one processor and comprising:

acquiring first virtual LiDAR data of a first data type associated with a virtual LiDAR sensor;

performing a dropout process on the first virtual LiDAR data of the first data type;

acquiring, based on the dropout process, second virtual LiDAR data of the first data type;

converting, using a signal intensity model associated with an actual LiDAR sensor, the second virtual LiDAR data of the first data type into second virtual LiDAR data of a second data type; and outputting the second virtual LiDAR data of the second data type, wherein the signal intensity model associated with the actual LiDAR sensor is a model prepared in advance by:

acquiring actual LiDAR data generated by the actual LiDAR sensor;

categorizing, based on non linear distance intervals and an environmental condition, the actual LiDAR data; and generating a probability density function (PDF) of a signal intensity distribution for each category associated with the categorized actual LiDAR data, and wherein the non-linear distance intervals are determined by non linearly dividing a distance between the actual LiDAR sensor and an object.

2. The method according to claim 1, wherein each point in the first virtual LiDAR data of the first data type comprises position information of the object, surface normal information of the object, color information of the object, and object type information of the object.

3. The method according to claim 1, wherein the acquiring the second virtual LiDAR data of the first data type comprises:

determining a dropout score for each point included in the first virtual LiDAR data of the first data type; and removing, based on the dropout score, at least one point of the points in the first virtual LiDAR data of the first data type to acquire the second virtual LiDAR data of the first data type.

4. The method according to claim 3, wherein the dropout score for each point included in the first virtual LiDAR data is determined based on:

path information of light emitted from the virtual LiDAR sensor;

surface normal information of the object;

color information of the object; and object type information of the object.

5. The method according to claim 1, wherein each point in the second virtual LiDAR data of the first data type comprises position information of the object and object type information of the object.

6. The method according to claim 1, wherein the non-linear distance intervals increase in length as a distance from the actual LiDAR sensor increases.

7. The method according to claim 1, wherein the converting the second virtual LiDAR data of the first data type into the second virtual LiDAR data of the second data type comprises:

acquiring a specific point included in the second virtual LiDAR data of the first data type;

acquiring distance information and object type information associated with the specific point;

acquiring environmental information associated with the virtual LiDAR sensor;

acquiring a probability density function for a specific category, wherein the specific category is associated with at least one of the distance information, the object type information, or the environmental information; and generating, based on the probability density function for the specific category, signal intensity information of the specific point.

8. The method according to claim 7, wherein the environmental information comprises at least one of time information, weather information, temperature information, or season information.

9. The method according to claim 1, wherein each point in the second virtual LiDAR data of the second data type comprises position information of the object and signal intensity information of a specific point.

10. The method according to claim 1, wherein:

a quantity of points in the second virtual LiDAR data of the first data type is less than a quantity of points in the first virtual LiDAR data of the first data type, the first data type is different from the second data type, and the second data type is associated with simulation of LiDAR data generated by the actual LiDAR sensor.

11. The method according to claim 1, further comprising:

controlling, based on the second virtual LiDAR data of the second data type, at least one of:

autonomous driving simulation; or autonomous driving of a vehicle.

12. A non-transitory computer-readable recording medium storing instructions that, when executed by one or more processors, cause:

acquiring first virtual LiDAR data of a first data type associated with a virtual LiDAR sensor;

performing a dropout process on the first virtual LiDAR data of the first data type;

acquiring based on the dropout process, second virtual LiDAR data of the first data type;

converting, using a signal intensity model associated with an actual LiDAR sensor, the second virtual LiDAR data of the first data type into second virtual LiDAR data of a second data type, and outputting the second virtual LiDAR data of the second data type, wherein the signal intensity model associated with the actual LiDAR sensor is a model prepared in advance by:

acquiring actual LiDAR data generated by actual LiDAR sensor;

categorizing, based on non-linear distance intervals and an environmental condition, the actual LiDAR data; and generating a probability density function (PDF) of a signal intensity distribution for each category associated with the categorized actual LiDAR data, and wherein the non-linear distance intervals are determined by non-linearly dividing a distance between the actual LiDAR sensor and an object.

13. An information processing system, comprising:

one or more processors; and a memory storing one or more computer-readable programs that, when executed by the one or more processors, cause the information processing system to:

acquire first virtual light detection and ranging (LiDAR) data of a first data type associated with a virtual LiDAR sensor;

perform a dropout process on the first virtual LiDAR data of the first data type;

acquire, based on the dropout process, second virtual LiDAR data of the first data type;

convert, using a signal intensity model associated with an actual LiDAR sensor, the second virtual LiDAR data of the first data type into second virtual LiDAR data of a second data type; and output the second virtual LiDAR data of the second data type, wherein the signal intensity model associated with the actual LiDAR sensor is a model prepared in advance by:

acquiring actual LiDAR data generated by the actual LiDAR sensor;

categorizing, based on non-linear distance intervals and an environmental condition, the actual LiDAR data; and generating a probability density function (PDF) of a signal intensity distribution for each category associated with the categorized actual LiDAR data, and wherein the non-linear distance intervals are determined by non-linearly dividing a distance between the actual LiDAR sensor and an object.

14. The information processing system according to claim 13, wherein:

a quantity of points in the second virtual LiDAR data of the first data type is less than a quantity of points in the first virtual LiDAR data of the first data type, the first data type is different from the second data type, and the second data type is associated with simulation of LiDAR data generated by the actual LiDAR sensor.

15. The information processing system according to claim 13, wherein the one or more computer-readable programs, when executed by the one or more processors, cause the information processing system to:

control, based on the second virtual LiDAR data of the second data type, at least one of:

autonomous driving simulation; or autonomous driving of a vehicle.

16. The information processing system according to claim 13, wherein each point in the first virtual LiDAR data of the first data type comprises position information of the object, surface normal information of the object, color information of the object, and object type information of the object.

17. The information processing system according to claim 13, wherein the one or more computer-readable programs, when executed by the one or more processors, cause the information processing system to acquire the second virtual LiDAR data of the first data type by:

determining a dropout score for each point included in the first virtual LiDAR data of the first data type; and removing, based on the dropout score, at least one point of the points in the first virtual LiDAR data of the first data type to acquire the second virtual LiDAR data of the first data type.

18. The information processing system according to claim 13, wherein each point in the second virtual LiDAR data of the first data type comprises position information of the object and object type information of the object.

19. The information processing system according to claim 13, wherein the non-linear distance intervals increase in length as a distance from the actual LiDAR sensor increases.

20. The information processing system according to claim 13, wherein each point in the second virtual LiDAR data of the second data type comprises position information of the object and signal intensity information of a specific point.

* * * * *